United States Patent [19]

Nardi et al.

[11] 4,117,207

[45] Sep. 26, 1978

[54] MOLYBDENUM CHLORIDE-TETRACHLOROALUMINATE THERMAL BATTERY

[76] Inventors: John C. Nardi, 3398 Tyler Dr., Brunswick, Ohio 44212; Charles L. Hussey, Quarters 6402H; John K. Erbacher, Quarters 4501-H, both of USAF Academy, Colo. 80840; Lowell A. King, 460 Wintery Circle N., Colorado Springs, Colo. 80919; Armand A. Fannin, Jr., 4311-G, USAF Academy, Colo. 80840

[21] Appl. No.: 842,141

[22] Filed: Oct. 14, 1977

[51] Int. Cl.² .......................................... H01M 4/36
[52] U.S. Cl. .................................. 429/103; 429/104; 429/112; 429/191; 429/199; 429/218
[58] Field of Search ............... 429/112, 103, 101, 104, 429/102, 191, 199, 218

[56] References Cited

U.S. PATENT DOCUMENTS

| | | | |
|---|---|---|---|
| 3,645,792 | 2/1972 | Hacha | 429/112 |
| 3,751,298 | 8/1973 | Senderoff | 429/112 |
| 3,957,532 | 5/1976 | Settle et al. | 429/218 |
| 3,988,163 | 10/1976 | Sklarchuk | 429/103 |
| 4,064,327 | 12/1977 | King et al. | 429/112 |

*Primary Examiner*—Charles F. LeFevour
*Attorney, Agent, or Firm*—Joseph E. Rusz; William J. O'Brien

[57] ABSTRACT

A thermally activated reserve battery operable within a temperature range of about 165° to 250° C and composed of a lithium-aluminum alloy anode, a molybdenum pentachloride cathode and a separating electrolyte composed of sodium tetrachloroaluminate.

2 Claims, 9 Drawing Figures

$$R = \frac{\Delta V}{\Delta I} = .63 \Omega$$

MOLYBDENUM CHLORIDE-TETRACHLOROALUMINATE THERMAL BATTERY

STATEMENT OF GOVERNMENT INTEREST

The invention described herein may be manufactured and used by or for the Government for governmental purposes without the payment of any royalty thereon.

BACKGROUND OF THE INVENTION

This invention relates, to a thermally activated reserve battery. More particularly, this invention concerns itself with an expendable, pelletized thermal battery which utilizes molybdenum pentachloride and an alkali tetrachloroaluminate as electrolytic ingredients.

The recent development and interest in weight sensitive communication systems, especially for airborne applications, has provided an impetus for researching new electrochemical power sources that utilize electrolytes of inorganic salts that remain solid and inactive at storage temperatures. Activation of the power source or electrochemical cell takes place when the cell is heated to an elevated temperature. The electrolyte melts at the high temperature and becomes ionically conductive. The high temperatures which activate these thermal batteries are operated by pyrotechnic heat sources, such as heat powders or heat papers.

The thermally activated characteristics of thermal batteries makes them capable of essentially unlimited storage life, rapid and reliable activation, and the ability to withstand high spin rates, severe shock and vibrations. Therefore, they are especially adaptable at fulfilling certain military, aerospace and emergency applications.

SUMMARY OF THE INVENTION

The present invention concerns itself with a thermally activated reserve battery based on the utilization of a fused salt electrolyte system. There are relatively few electrochemical systems suitable for use in thermal batteries capable of achieving high energy density. Thermal batteries, presently in use, generally utilize LiCl—KCl or LiBr—KBr electrolytes. These batteries, however, operate at relatively high temperatures in the range of 400° to 600° C., thereby incurring the inherent disadvantages associated with a high temperature operation. The disadvantages of high temperature operation, however, have been overcome by the present invention which utilizes a novel low temperature electrochemical system for use in high energy density thermal batteries.

The battery of this invention is a thermally activated, high energy density electrochemical power source that utilizes molybdenum chloride and sodium tetrachloroaluminate as an electrolytic medium. It comprises a single cell or stack of individual cells, each cell of which consists of a three layered pellet, and two inert metal plates which serve as current collectors. Heat powder on heat paper is positioned around the cell to provide the required high temperature environment needed to heat the battery to operating temperature. Inter-cell connections, means to initiate the heat paper or powder, and a suitable container complete the essential components of the battery.

The three layered pellet comprises an anode layer composed of either lithium, aluminum, a lithium-aluminum alloy or amalgamated aluminum; an anolyte second layer composed of a sodium tetrachloroaluminate-binder mixture; and a third catholyte layer composed of a mixture of molybdenum pentachloride, graphite, and a single or mixed electrolyte of sodium tetrachloroaluminate plus binder. The cell operates within a temperature range of from about 165° to 250° C. and is intended to be expendable since it is constructed of low cost materials.

Accordingly, the primary object of this invention is to provide a thermally activated primary battery that is operable within a temperature range of from about 165° to 250° C.

Another object of this invention is to provide a high energy, thermally activated reserve battery that utilizes molybdenum pentachloride as a catholyte.

Still another object of this invention is to provide a light-weight, reliable thermal battery fabricated from low cost materials that renders it readily expendable.

The above and still other objects and advantages of the present invention will become more readily apparent upon consideration of the following detailed description thereof when taken in conjunction with the accompanying drawings.

DESCRIPTION OF THE PREFERRED EMBODIMENTS

Pursuant to the above-defined objects, the present invention provides a thermally activated reserve battery that utilizes molybdenum pentachloride and sodium tetrachloroaluminate as an electrolytic medium. The battery is activated at relatively low temperatures in the range of 165° to 250° C. and consists of a single cell or stack of individual cells. A typical cell is composed of a three-layered pellet composed of an anode, an anolyte and a catholyte. The pellet is sandwiched between two inert metal current collectors. Suitable heat activating means, such as heat powder or heat paper is positioned around the cell along with conventional means for initiating the heat activating means. Intercell connectors and a suitable container also form part of the battery of this invention. However, a detailed discussion of the heat activating means, multiple cell stacks, or typical thermal battery container has not been presented since these technologies are well known and those skilled in the art can easily accommodate these thermal battery components to the molybdenum pentachloridesodium tetrachloroaluminate system of the invention.

The anode of a typical cell of this invention may be composed of either lithium, aluminum, lithium-aluminum alloys, or amalgamated aluminum. The separating electrolyte or anolyte consists of a binder material and sodium tetrachloroaluminate. The binder is used to immobilize the anolyte and consists of a finely divided silica such as the high surface area silicon dioxide manufactured by the Cabot Corporation as Cab-O-Sil. The catholyte component is composed of molybdenum pentachloride, graphite, and a single or mixed electrolyte of sodium tetrachloroaluminate plus binder. The sodium tetrachloroaluminate/binder mixture used in the anolyte and catholyte usually had the same composition, but in some cases were purposely changed to examine battery performance based on anolyte or catholyte composition. The anodic and cathodic current collectors consist of an inert metal such as nickel, tungsten or stainless steel.

Figure 1:
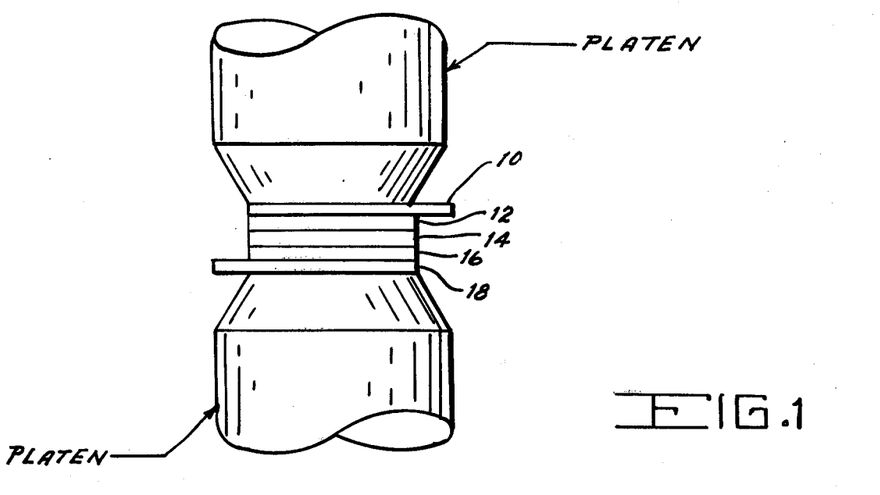
FIG. 1 represents an isometric view of a typical cell of this invention.

In order to illustrate the invention with greater specificity, reference is now made to FIG. 1 of the drawing wherein there is shown a typical cell of this invention comprising an anodic current collector 10 and a cathodic current collector 18. Both collectors are composed of a 5 mil thick, 99.98 percent pure nickel foil which was cut into 1.125 inch diameter cicles with tab. The collectors were burnished with emery paper, washed with water and acetone, and again lightly burnished before use.

The anode 12 is composed of a lithium-aluminum alloy fabricated by alloying 28 weight percent lithium with aluminum powder.

The anolyte 14 is prepared as a stock electrolyte from equimolar amounts of $AlCl_3$ and NaCl, saturated with NaCl, and hot mixed at 175° C. with 10 weight percent Cab-O-Sil to give the mix the consistency of wet flour. It is then pulverized in a micromill. The net composition comprises about 49.8 mole percent NaCl and about 50.2 mole percent $AlCl_3$.

The catholyte 16 is formed from anhydrous molybdenum pentachloride which is 99.5% pure and in granular form. 0.72 grams of 30-50 mesh size particles of the pentachloride were sieved and mixed with 0.64 grams of the stock electrolyte referred to above and 0.28 grams of graphite.

The pellets were formed in a 1.125 inch Carver die and three-layer pellets were formed in all cases when using powdered anode material. Two-layered pellets were formed, however, whenever a sheet material, such as a lithium-aluminum alloy sheet having 90.9 atomic percent aluminum, was employed.

The technique for coating the pellets was to first spread the desired weight of anode material over the die surface and press it into a pellet. Secondly, the correct amount of anolyte mix was spread over the anode pellet and pressed into a bipellet. Lastly, the catholyte, an evenly blended mixture of specified amounts of molybdenum pentachloride, graphite, and stock electrolyte, was spread over the anolyte side of the bipellet and pressed to form a three-layered single cell.

There is a considerable variation possible in the composition of the anode, electrolyte/binder composition, die pressure and amount of material of each layer of the simple cell. The specific details referred to below therefore are presented with reference to the cell of FIG. 1 and should not be construed as limiting the scope of the invention.

In preparing the cell of FIG. 1, 0.43 grams of the LiAl powder was placed in the Carver die and pressed at 2000 psig. Next, 0.72 grams of the dry stock electrolyte, after pulverizing, was placed in the die, spread evenly over the anode and pressed at 2750 psig. Lastly, 1.64 grams of the catholytic blend was spread evenly over the bipellet already in the Carver die. The entire pellet was then pressed with a pressure of 3500 psig. The resultant cell was then held in position by a platen press, as shown in FIG. 1 with a pressure of 4.5 pounds per square inch at ambient temperature in order to test the cell.

The first test results were concerned with optimizing the weight ratios for the single cell components to give the maximum energy density output. The weight of only one variable was changed during testing in order to realize the effect on overall cell performance. Variables considered were the weight of the anode, weight of separating electrolyte, and the individual weights of electrolyte, $MoCl_5$, and graphite in the catholyte. A typical set of experimental results for a one component optimization is shown in Table I. A graphite weight of 0.23 grams was selected since it gave the highest coulombic and energy density output during cell discharge to zero volts. A similar set of experiments was conducted for each cell component as shown in Tables II to VII.

TABLE I

OPTIMIZATION OF GRAPHITE WEIGHT:
15 mA/cm$^2$, 200° C

| Graphite Weight (g) | Charge (coul) | Energy Density (W-Hr/lb) |
|---|---|---|
| .18 | 500.4 | 29.1 |
| .21 | 523.5 | 28.2 |
| .23 | 581.2 | 31.4 |
| .25 | 563.9 | 29.4 |
| .27 | 548.5 | 28.4 |

$^a$Cell Configuration:
Anode .27 g LiAl (60.2 a/o)
Separator .78 g 90 w/o electrolyte$^b$-10 w/o Cab-O-Sil
Catholyte .64 g 90 w/o electrolyte$^b$-10 w/o Cab-O-Sil
.72 g MoCl$_5$ (30–50 mesh)
$^b$Electrolyte consists of 49.85 m/o AlCl$_3$-50.15 m/o NaCl

TABLE II

OPTIMIZATION OF LiAl Composition
25 mA/cm$^2$, 200° C$^a$

| LiAl a/o | Charge (coul) | Energy Density (W-Hr/lb) |
|---|---|---|
| 48.0 | 568 | 34.5 |
| 60.2 | 609 | 37.0 |
| 90.9 | 619 | 33.5 |

$^a$Cell Configuration:
Anode .27 g LiAl
Separator .78 g 90 w/o electrolyte$^b$-10 w/o Cab-O-Sil
Catholyte .64 g 90 w/co electrolyte$^b$-10 w/o Cab-O-Sil
.72 MoCl$_5$ (30–50 mesh)
.23 graphite
$^b$Electrolyte consists of 49.85 m/o AlCl$_3$-50.15 m/o NaCl

TABLE III

OPTIMIZATION OF MoCl$_5$ PARTICLE SIZE:
15 mA/cm$^2$, 200° C$^a$

| Particle Size | Charge (coul) | Energy Density (W-Hr/lb) |
|---|---|---|
| >30 | 483.1 | 24.2 |
| 30–50 | 458.0 | 22.2 |
| 50–100 | 413/0 | 17.4 |

TABLE III-continued
OPTIMIZATION OF MoCl₅ PARTICLE SIZE: 15 mA/cm², 200° C$^a$

| Particle Size | Charge (coul) | Energy Density (W-Hr/lb) |
|---|---|---|
| <100 | 365.8 | 16.9 |

$^a$Cell Configuration:
Anode .34 g LiAl (60.2 a/o)
Separator .82 g 90 w/o electrolyte$^b$-10 w/o Cab-O-Sil
Catholyte .64 g 90 s/o electrolyte$^b$-10 w/o Cab-O-Sil
.72 g MoCl₅
.23 g graphite
$^b$Electrolyte consists of 49.85 m/o AlCl₃-50.15 m/o NaCl

TABLE IV
OPTIMIZATION OF ANODE WEIGHT: 15 mA/cm², 200° C$^a$

| Anode Weight (g) | Charge (coul) | Energy Density (W-Hr/lb) |
|---|---|---|
| .27 | 513.9 | 27.6 |
| .29 | 475.3 | 26.3 |
| .34 | 458.1 | 22.2 |
| .43 | 496.5 | 19.8 |

$^a$Cell Configuration:
Anode LiAL (60.2 a/o)
Separator .82 g 90 w/o electrolyte$^b$-10 w/o Cab-O-Sil
Catholyte .64 g 90 w/o electrolyte$^b$-10 w/o Cab-O-Sil
.72 g MoCl₅ (30-50 mesh)
.23 g graphite
$^b$Electrolyte consists of 49.85 m/o AlCl₃-50.15 m/o NaCl

TABLE V
OPTIMIZATION OF SEPARATING ELECTROLYTE WEIGHT: 15 mA/cm², 200° Ca

| Electrolyte Weight (g) | Charge (coul) | Energy Density (W-Hr/lb) |
|---|---|---|
| .74 | 567.8 | 30.6 |
| .78 | 581.2 | 31.4 |
| .82 | 475.3 | 27.6 |
| .99 | 307.9 | 11.9 |

$^a$Cell Configuration:
Anode .27 g LiAl (60.2 a/o)
Catholyte .64 g 90 w/o electrolyte$^b$-10 c/o Cab-O-Sil
.72 g MoCl₅ (30-50 mesh)
.23 g graphite
$^b$Electrolyte consists of 49.85 m/o AlCl₃-50.15 m/o NaCl

TABLE VI
OPTIMIZATION OF ELECTROLYTE WEIGHT IN CATHOLYTE: 15 mA/cm², 200° C$^a$

| NaAlCl₄ Weight (g) | Charge (coul) | Energy Density (W-Hr/lb) |
|---|---|---|
| .51 | 454.2 | 27.2 |
| .58 | 381.1 | 21.1 |
| .64 | 581.2 | 31.4 |
| .77 | 421.5 | 24.1 |
| .90 | 392.6 | 22/4 |

$^a$Cell Configuration:
Anode .27 g LiAl (60.2 a/o)
Separator .78 g 90 w/o electrolyte$^b$-10 w/o Cab-O-Sil
Catholyte .72 g MoCl₅ (30-50 mesh)
.23 g graphite
$^b$Electrolyte consists of 49.85 m/o AlCl₃-50.15 m/o NaCl

TABLE VII
OPTIMIZATION OF MoCl₅ WEIGHT: 15 mA/cm², 200° C$^a$

| MoCl₅ (30-50 mesh) Weight (g) | Charge (coul) | Energy Density (S-Hr/lb) |
|---|---|---|
| .52 | 525.4 | 28.7 |
| .72 | 581.2 | 31.4 |
| .79 | 569.7 | 31.3 |
| .86 | 515.8 | 27.8 |
| .94 | 563.9 | 32.6 |
| 1.00 | 525.4 | 30.4 |

$^a$Cell Configuration:
Anode .27 g LiAl (60.2 a/o)
Separator .78 g 90 w/o electrolyte$^b$-10 w/o Cab-O-Sil
Catholyte .64 g 90 w/o electrolyte$^b$-10 w/o Cab-O-Sil
.23 g graphite
$^b$Electrolyte consists of 49.85 m/o AlCl₃-50.15 m/o NaCl During the optimization of the anode weight, an increase in energy density output was observed as the weight of the LiAl anode was decreased. This is shown in Table IV. Anodes weighing less than 0.27 g could not be fabricated using the available Carver die. Subsequent calculations will show that, assuming the aluminum anode, the anode weight could be reduced even further, with an increase in cell performance.

Figure 2A:
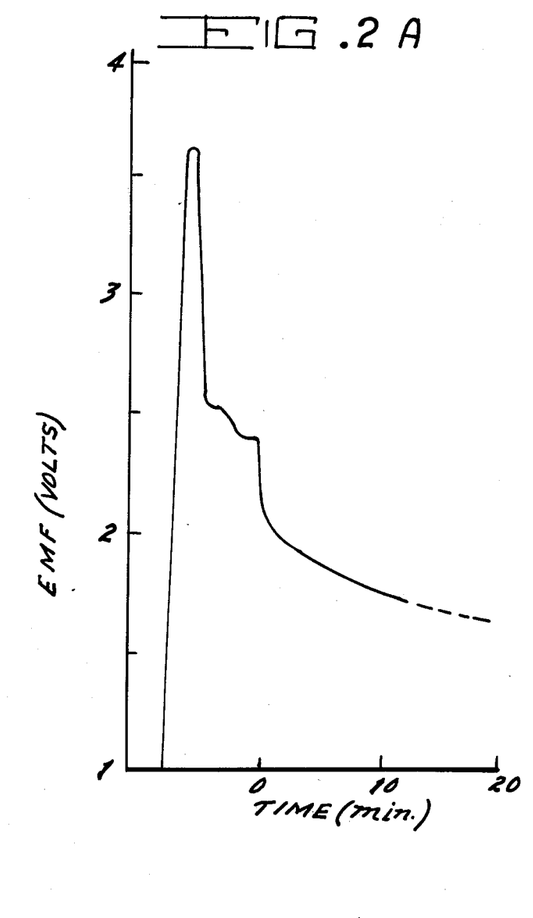
FIG. 2 is a graphical illustration comparing the voltage-time curve prior to discharge of a (A) LiAl/NaAlCl$_4$/MoCl$_5$ single cell and a (B) Al/NaAlCl$_4$/MoCl$_5$ single cell.
Figure 2B:
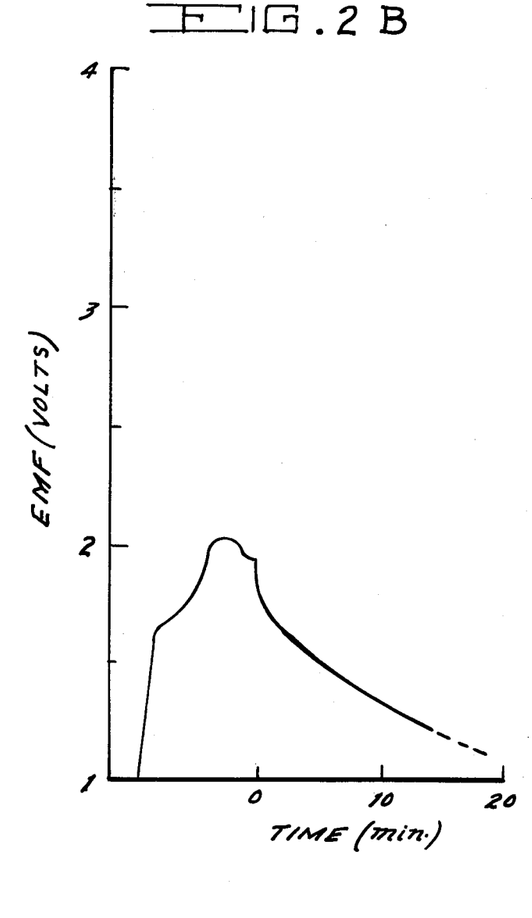

Anodes prepared from pure aluminum and from 48.0 a/o 60.2 a/o, and 90.9 a/o LiAl alloys were coupled with the MoCl₅ cathode. Cell output was greatly enhanced by using LiAl alloys rather than pure aluminum as shown in FIG. 2. This may result from (a) the lithium preventing formation of an insulating oxide layer on the aluminum electrode, (b) the lithium reacting with the oxide layer, or (c) the coupling of the cathode with elemental lithium contained in the alloy material. A comparison of the voltage-time curves during heating of the platens prior to discharge shows an initial high voltage spike as shown in FIG. 2a, that is probably due to the Li/MoCl₅ couple. This voltage spike is absent when using a pure aluminum anode as shown in FIG. 2B.

Figure 3:
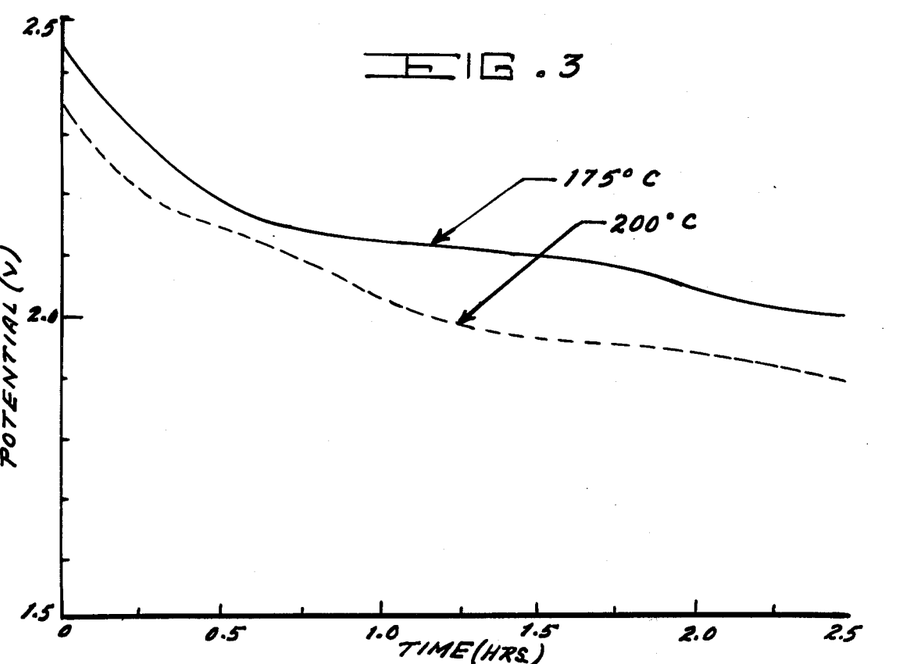
FIG. 3 is a graphical illustration showing the open-circuit discharge of a LiAl/NaAlCl$_4$/MoCl$_5$ single cell at 175° and 200° C.
Figure 4:
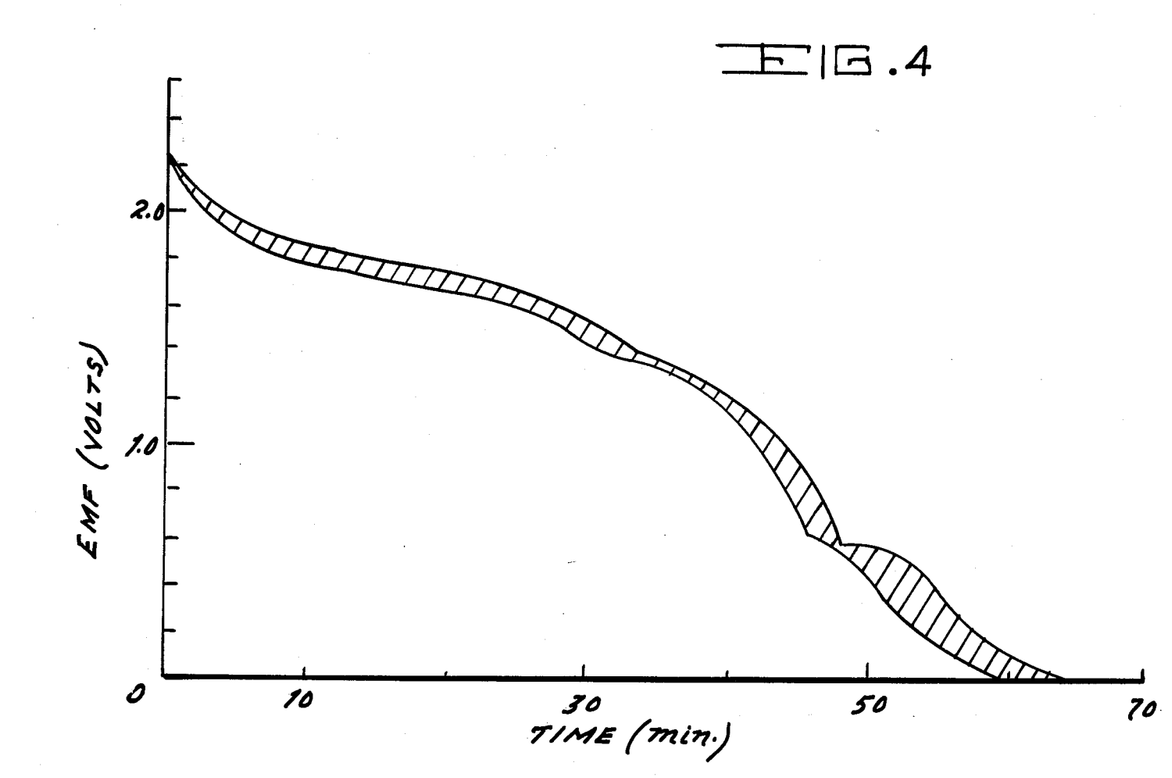
FIG. 4 is a graphical illustration showing the discharge performance envelope for three single cells utilizing 48.0, 60.2 and 90.9a/o LiAl anodes at 25 mA/cm$^2$ and 200° C.

It was observed that the spike reached a maximum between 150–160° C., the melting range of the electrolyte. The presence of a sharp spike correlated positively with good quality single cell output characteristics. Voltage spiking before discharge has been observed heretofore with both a lithium-boron alloy anode and a pure lithium anode. Cell behavior during discharge was observed that suggested aluminum is oxidized rather than lithium. This was shown by the 1.8V potential established during the self discharge of an optimized single cell as shown in FIG. 3. This voltage corresponds to the potential for a pure aluminum anode in this AlCl₃—NaCl electrolyte. The use of different atomic percent LiAl alloy anodes as shown in Table II shows little difference in total energy density output, giving added credence to the suggested functions of lithium in the anode. The performance of the three different LiAl alloys are shown within the limits of FIG. 4. Based on total energy density produced during a single cell discharge, the 60.2 a/o LiAl alloy was selected.

Figure 5:
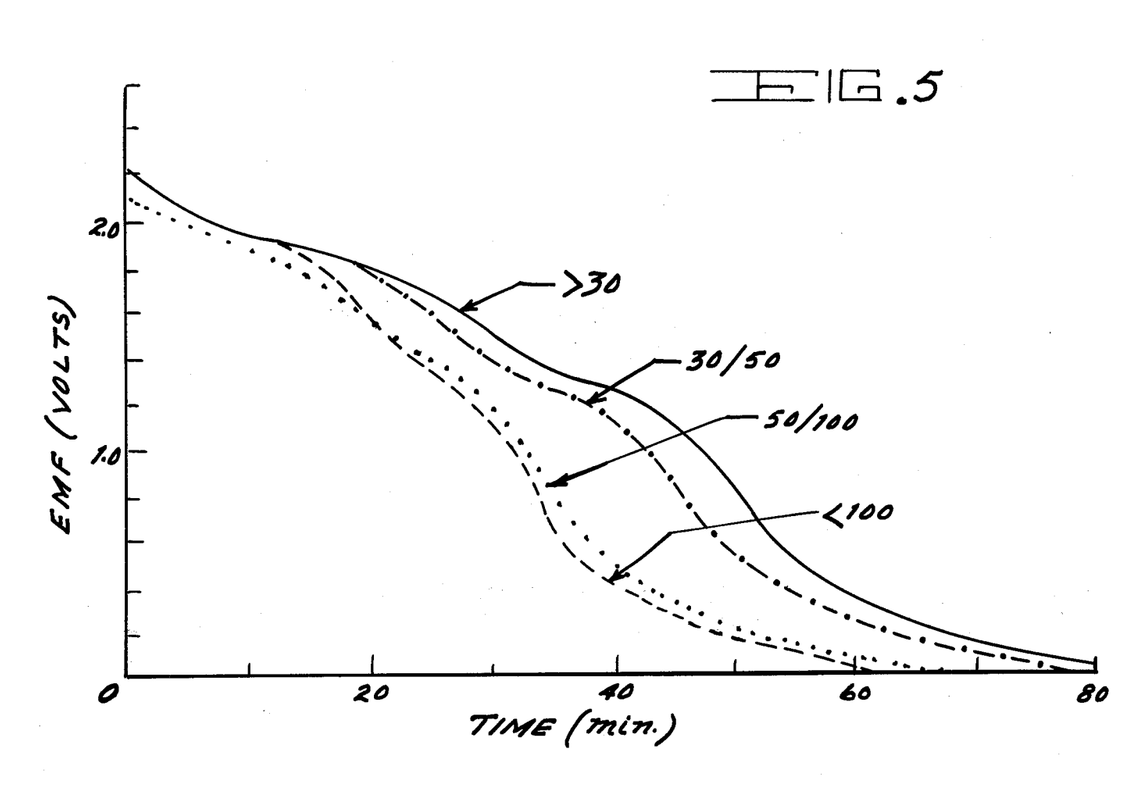
FIG. 5 is a graphical illustration showing the effect of MoCL$_5$ particle size on the discharge curves at 15 mA/cm$^2$ and 200° C.

The effect of the MoCl₅ particle size on overall performance as shown in FIG. 5 shows that the highest energy density was obtained with the larger particle size (>30), but using this size resulted in a crumbly catholyte layer with ragged edges. To insure more uniform pellet construction, the 30–50 mesh particle size was selected for the final cell configuration. The improved performance by cells with the larger MoCl₅ particle size could be explained assuming that the larger, lower surface area particles dissolve at a slower rate in the electrolyte, and thus diffusional migration to the anode resulting in internal shorting is lessened.

Figure 6:
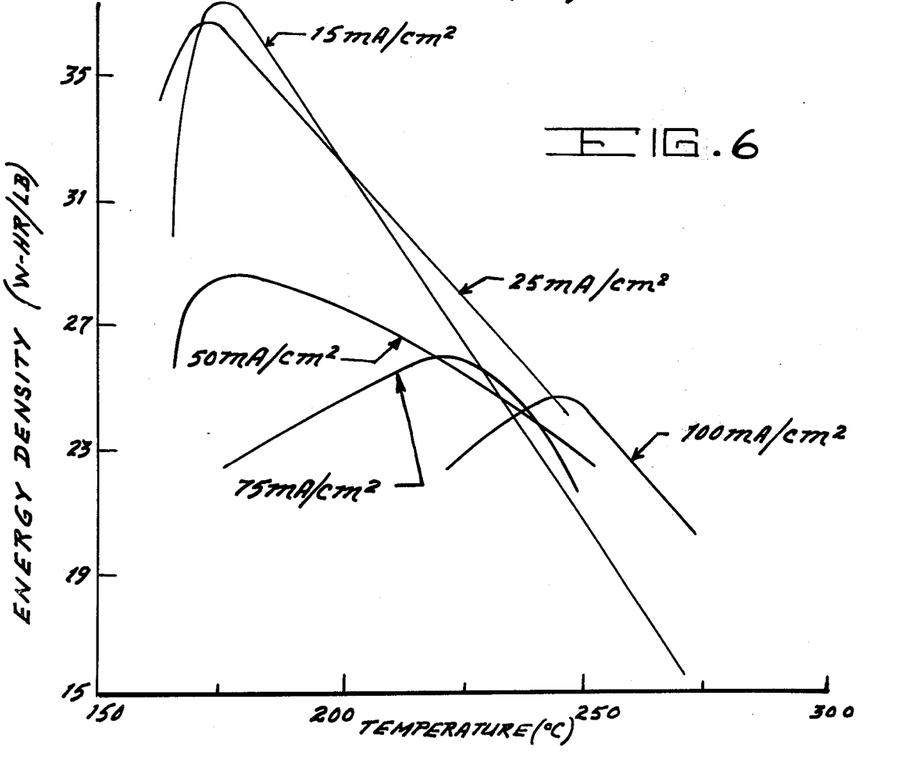
FIG. 6 is a graphical illustration showing energy density as a function of temperature at discharge rates of 15, 25, 50, 75 and 100 mA/cm$^2$.

Optimized single cells were subjected to changes in operating temperatures and discharge rates. Constant current discharges of 5, 15, 25, 50, 75, and 100 mA/cm², at temperatures of 175°, 200°, 225°, and 250° C., as shown in FIG. 6, were used to determine operational parameters. At operating temperatures above the melting point of MoCl₅, 194.5° C., it was observed that a sharp drop-off in energy density output took place. This may be due to marked increase in the rate of diffusion of cathode material to the anode. However, open-circuit discharge curves at 175° C. and 200° C., as shown in FIG. 3, show no substantial increase in the decay of the open-circuit voltage above the melting point of MoCl₅.

The best observed energy density output of 37.8 watt-hr/lb was achieved at a temperature of 175° C. and a discharge rate of 15 mA/cm$^2$. The open circuit energy density based on an overall five electron reduction of molybdenum at the cathode is 190.4 watt-hr/lb. Comparing the energy density based only on the active anode and cathode components of 76.2 watt-hr/lb, the optimized single cell has an efficiency of 40.0%.

The total charge theoretically available from the 0.27 g 60.2 a/o LiAl anode and 0.72 g MoCl$_5$ cathode is 2086 and 1265 coulombs, respectively. This shows that the cathode is the limiting electrode. Further weight reduction of the anode could be possible, resulting in an enhanced energy density output.

The optimized single cell configuration at a discharge rate of 15 mA/cm$^2$ and operating temperature of 175° C. give a total charge of 616 coulombs to zero volts. This resulted in a 48.7% efficient cell based on coulombs available from the limiting cathode material.

Figure 7:
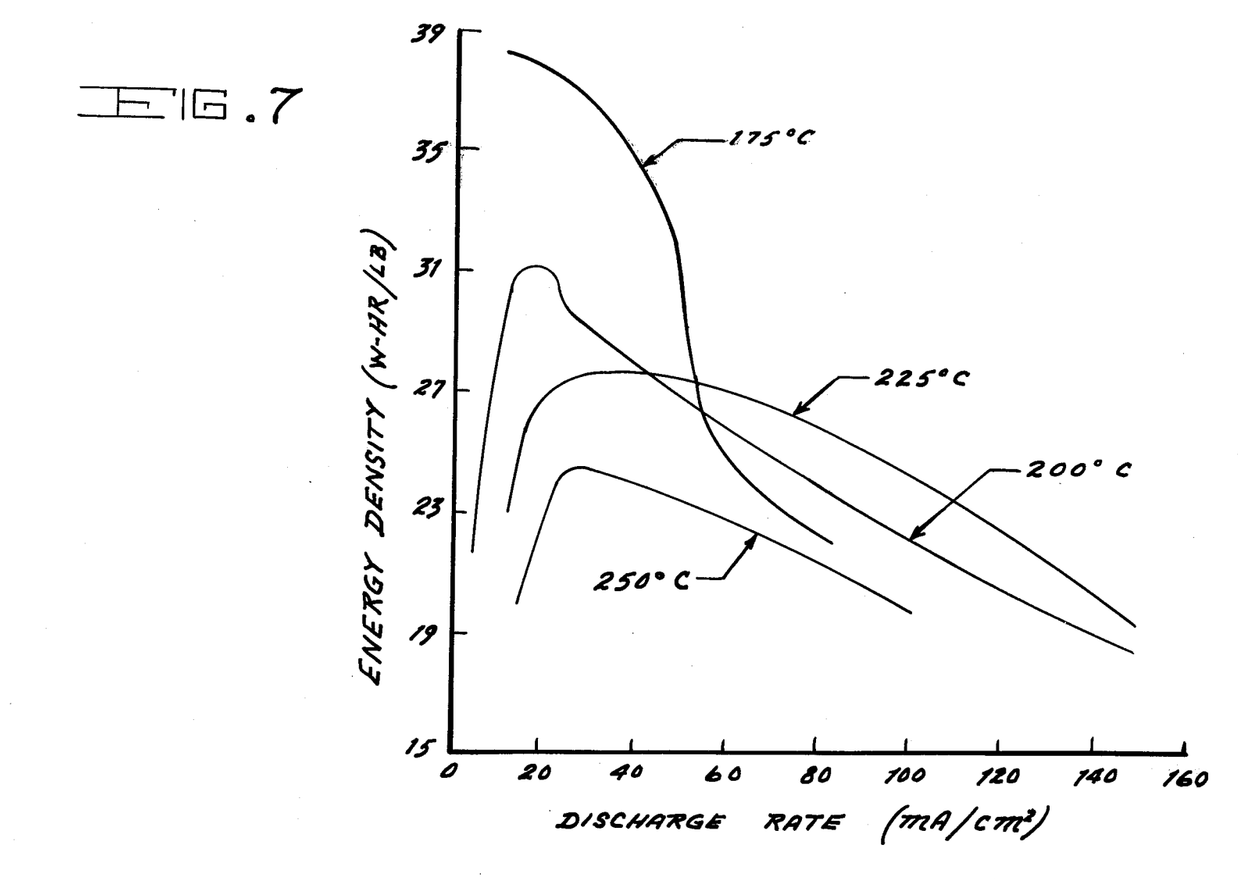
FIG. 7 is a graphical illustration showing energy density as a functional discharge rate at temperatures of 175°, 200°, 225° and 250° C.

At a discharge rate of 25 mA/cm$^2$, the performance (energy density) had only decreased to 37.0 watt-hr/lg. Subsequently, higher discharge rates showed a marked decrease in single cell output at all temperatures as shown by FIG. 7. This may be due to diffusional limitations and in addition, interposed chemical steps in the cathode reduction mechanism.

Figure 8:
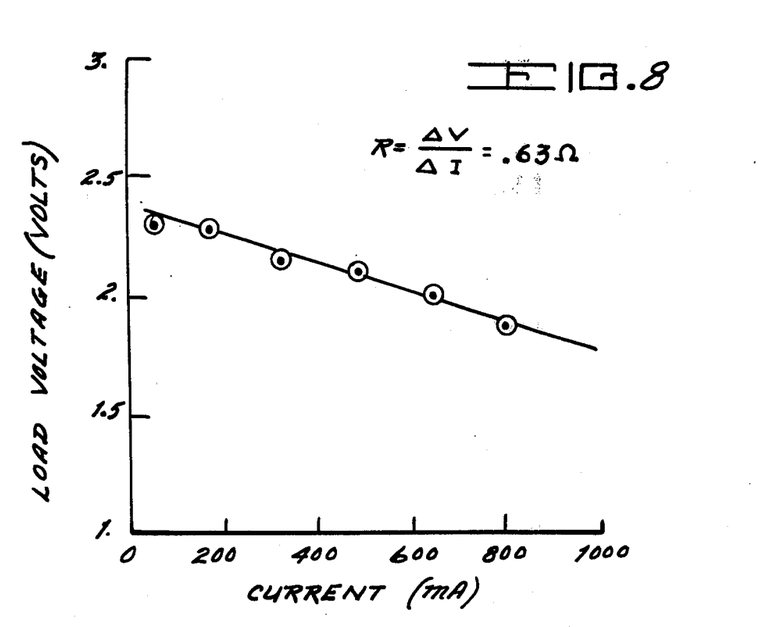
FIG. 8 is a graphical illustration showing the load voltage as a function of current for a LiAl(60.2 $^a$/$_o$)/NaAlCL$_4$/MoCl$_5$ single cell at 25 mA/cm$^2$ and 200° C.

Internal resistance is another important factor that must be considered in determining battery performance. It reduces the useful voltage of a cell and leads to internal heating and power losses. In this study as plot, as shown in FIG. 8, of load voltage versus current density was used to determine internal resistance. The data yielded an internal resistance value of 0.63 ohms for the LiAl/NaAlCl$_4$ MoCl$_5$ optimized single cell.

From a consideration of the foregoing, it can be seen that the present invention demonstrates an unexpected improvement in the development of thermal batteries. The invention provides a low temperature thermal battery which employs, preferably, lithium-aluminum alloy anodes, a molybdenum pentachloride cathode, and a NaCl-saturated AlCl$_3$—NaCl electrolyte. During the investigations that lead to the discovery of this invention, experimental results indicated that a cell optimized for maximum energy density output consists of a 60.2 atomic percent aluminum LiAl anode, a cathode of 30-50 ASTM mesh particle size MoCl$_5$ and graphite separated by a NaCl-saturated AlCl$_3$—NaCl electrolyte.

The operating conditions for maximum output exist at current densities of 15-25 mA/cm$^2$ at temperatures of 175-200° C., with a calculated internal resistance of 0.63 ohms. Preliminary cost estimates in a multicell battery indicate this system to be a viable competitor for current state of the art thermal batteries with the added advantage of lower operating temperatures.

While the principles of this invention have been described with particularity, it should be understood that various alterations and modifications may be made without departing from the spirit of the invention, the scope of which is defined by the appended claims.

What is claimed is:

1. A thermally activated, electrochemical power source comprising:
   (a) a solid anode composed of a material selected from the group consisting of lithium, aluminum, lithium-aluminum alloys and amalgamated aluminum,
   (b) a solid cathode composed of a mixture of molybdenum pentachloride, a sodium tetrachloroaluminate electrolyte and graphite, and
   (c) a solid sodium tetrachloroaluminate electrolyte positioned between and in contact with said anode and said cathode.

2. A thermally activated, electrochemical power source in accordance with claim 1 wherein said anode is composed of a lithium-aluminum alloy.

* * * * *